Figure 1:
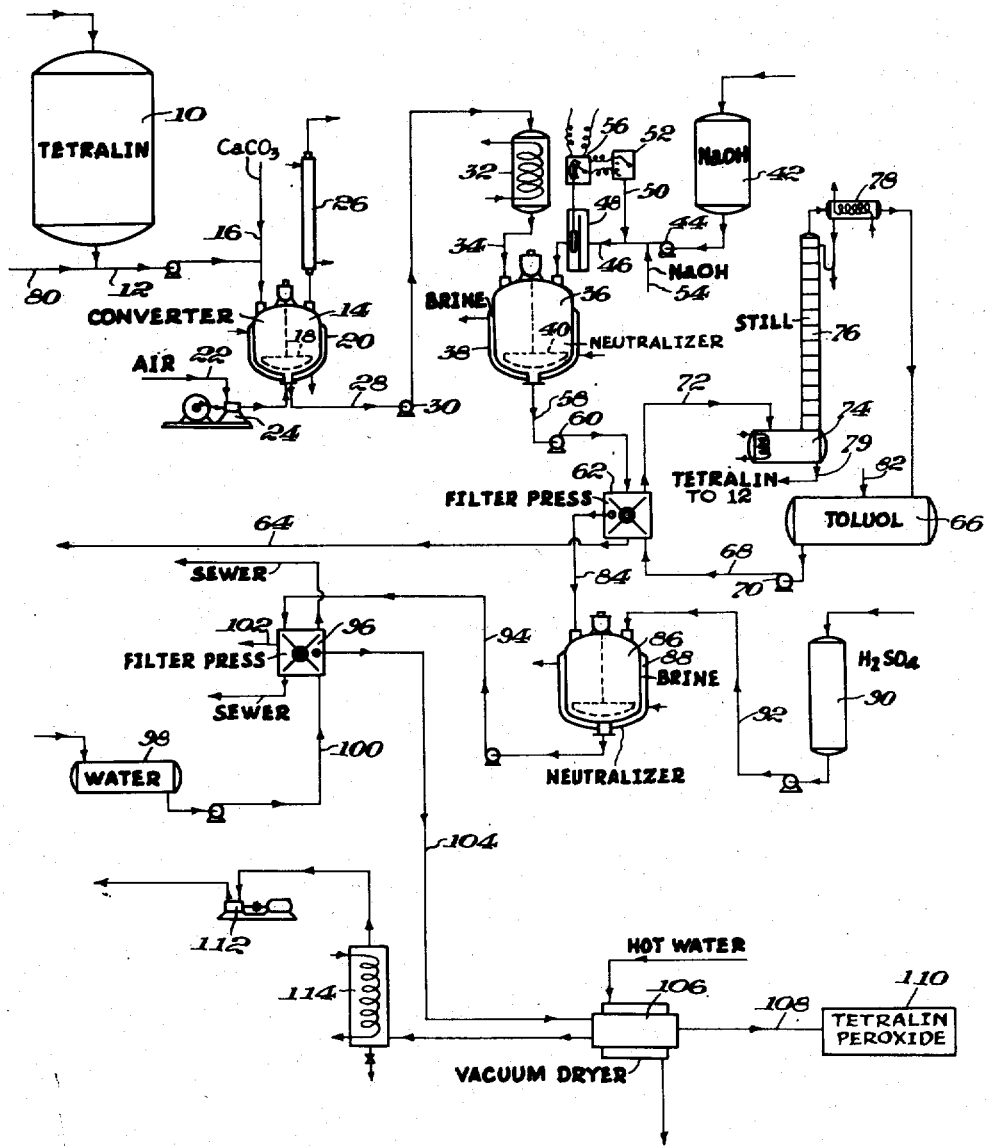

INVENTOR.
ROBERT JOHNSON

Patented Sept. 18, 1951

2,568,639

UNITED STATES PATENT OFFICE 2,568,639

PRODUCTION OF TETRAHYDRO-NAPHTHALENE PEROXIDE

Robert Johnson, Verona, Pa., assignor to Koppers Company, Inc., Pittsburgh, Pa., a corporation of Delaware Application November 2, 1948, Serial No. 57,967

3 Claims. (Cl. 260—610)

This invention relates to the production of tetrahydronophthalene peroxide. More particularly the invention relates to the production of tetrahydronaphthalene peroxide, alpha-tetralone and alpha-tetralol from tetrahydronaphthalene.

Tetrahydronaphthalene peroxide, a direct oxidation product of tetrahydronaphthalene has been found to be an excellent ignition accelerator to increase the cetane number of fuels for high speed diesel engines. Alpha-tetralol and alpha-tetralone are products resulting from the oxidation of tetrahydronaphthalene which are good insecticides, good synthesis intermediates and very effective solvents for resins and plastics. These three products are produced by the process of the present invention.

In my application Serial No. 656,782 filed March 23, 1946, now U. S. Patent 2,462,103, I have described a process of making tetrahydronaphthalene peroxide from tetrahydronaphthalene (a compound readily available in commerce, such as the compound sold under the trade name, "Tetralin") and a process for coverting the tetrahydronaphthalene peroxide to a mixture of alpha-tetralol and alpha-tetralone.

The primary object of the present invention is to provide a process by which the major portion of tetrahydronaphthalene is converted to tetrahydronaphthalene peroxide and a minor portion of tetrahydronaphthalene is recovered as alpha-tetralol and alpha-tetralone.

I have found that tetrahydronaphthalene peroxide may be separated from tetrahydronaphthalene and other reaction products formed in the oxidation reaction by precipitating the sodium salt of tetrahydronaphthalene peroxide and filtering to separate the salt from the mother liquor. The precipitation of the sodium salt of tetrahydronaphthalene peroxide is an important feature of the present invention because, if the sodium hydroxide solution is too dilute (less than 4% NaOH), the sodium salt will not precipitate but stay in solution. On the other hand if the sodium hydroxide solution is too concentrated (greater than 10% NaOH), then a bulky gelatinous precipitate is formed which cannot be handled.

Another object of the invention is to provide a process by which tetrahydronaphthalene peroxide may be produced in such a form that it may be effectively separated from the reaction products of the oxidation of tetrahydronaphthalene.

When tetrahydronaphthalene peroxide is converted into and precipitated as the sodium salt of tetrahydronaphthalene peroxide the mother liquor is made up of two solutions, i. e. an aqueous NaOH solution and a hydrocarbon tetrahydronaphthalene solution. Each of these solutions has some tetrahydronaphthalene peroxide dissolved therein. The tetrahydronaphthalene with a minor portion of tetrahydronaphthalene peroxide may be recycled back to the oxidation converter for retreatment, but the aqueous sodium hydroxide solution contains both NaOH and sodium tetrahydronaphthalene peroxide which should be recovered to make the process economical. By heating the aqueous NaOH solution to a temperature of 60° to 80° C. the sodium tetrahydronaphthalene peroxide is converted into approximately equal parts of alpha-tetralone and alpha-tetralol along with some NaOH. Thus the solvents alpha-tetralol and alpha-tetralone are recovered and the NaOH solution is available for separating tetrahydronaphthalene peroxide from the oxidation reaction products.

Another object of the invention is to provide a process of producing tetrahydronaphthalene peroxide in which NaOH used for neutralizing the oxidation products and unconverted tetrahydronaphthalene are recovered and recycled back to the oxidation unit.

A further object of the invention is to provide a process of recovering alpha-tetralol and alpha-tetralone from the neutralizing solution used for separating tetrahydronaphthalene peroxide from the oxidation reaction products.

With these and other objects in view, the invention consists in the process of producing tetrahydronaphthalene peroxide as hereinafter described and particularly defined in the claims.

Figure 1A:
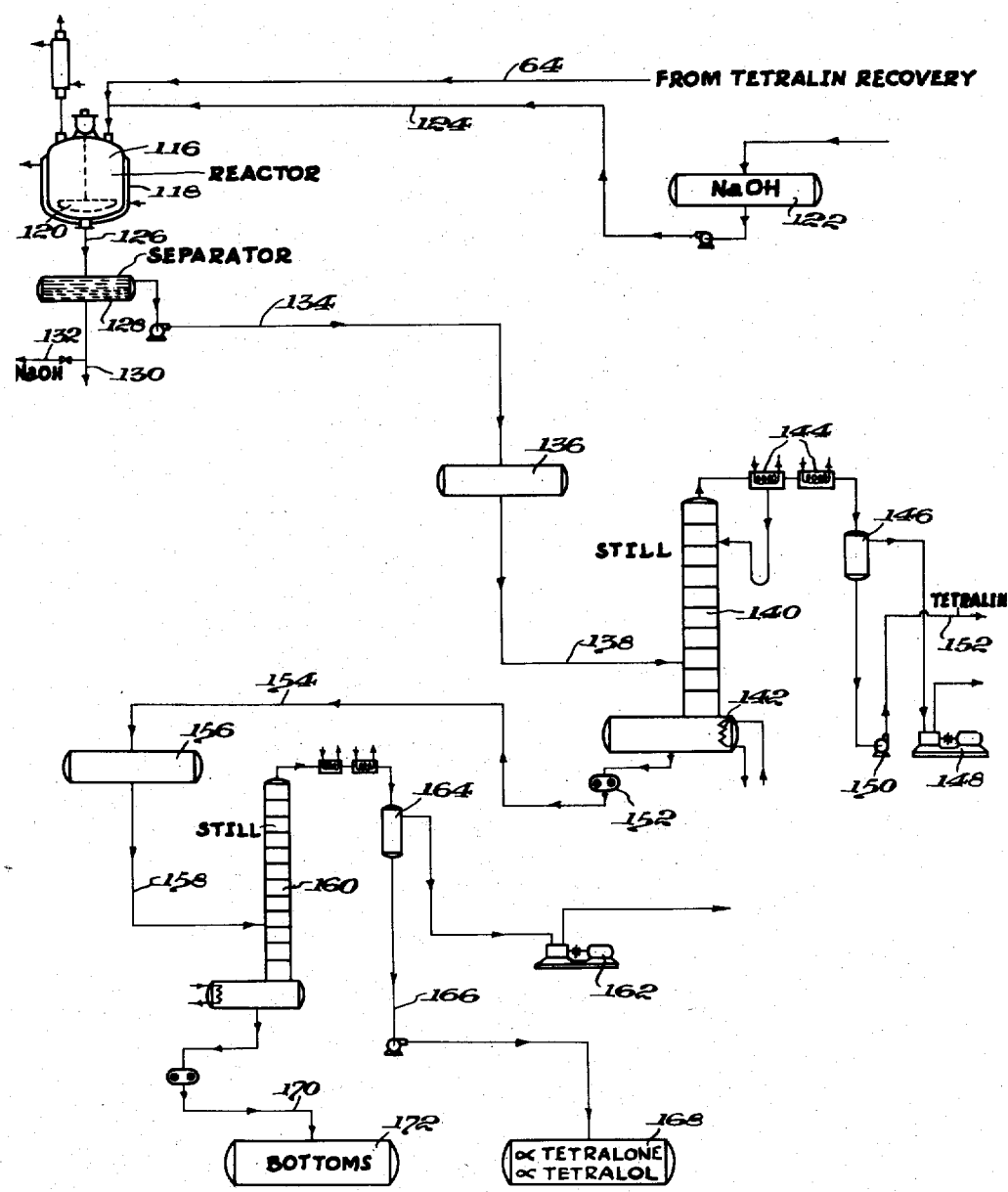

The various features of the invention are illustrated in the accompanying drawings in which Figures 1 and 1a show diagrammatically in flow sheet form an apparatus in which a preferred form of the invention may be carried out.

Referring to Figure 1, tetrahydronaphthalene is taken from a storage tank 10 and pumped through a line 12 to a converter 14. In passing through the line 12 cupric carbonate, an oxidation catalyst, is introduced into the tetrahydronaphthalene through a line 16. The converter 14 is provided with a stirrer 18 and heating jacket 20 which act to agitate and maintain the oxidation reaction mass at a temperature of 80° to 90° C. Air from a line 22 is forced by means of a compressor 24 into the bottom of the converter 14 for the purpose of oxidizing the tetrahydronaphthalene. The tetrahydronaphthalene is slowly added to the converter so that it remains in the converter for a period of two to five hours in which time the oxidation is completed to produce approximately 24% of tetrahydronaphthalene peroxide.

The air and inert gases pass out of the converter through a condenser 26 wherein any oxidation products are condensed and returned to the converter.

The tetrahydronaphthalene peroxide together with unoxidized tetrahydronaphthalene and other oxidation products are forced through a line 28 by pump 30 to a cooler 32. In the cooler 32 the temperature is reduced to a temperature of 10° to 20° C. and the oxidation products are then discharged through a line 34 into a neutralizer 36.

The neutralizer is provided with a brine jacket 38 and a stirrer 40 by which the oxidation products are maintained at a temperature of approximately 8° to 10° C. The oxidation products are neutralized by a sodium hydroxide solution which is drawn from a tank 42 and forced by pump 44 through a line 46 and hydrometer-controlled meter 48 into the neutralizer 36.

A 10% sodium hydroxide solution is normally maintained in the tank 42 and water is introduced into the line 46 through a line 50 through a control valve 52 in order to maintain approximately an 8° sodium hydroxide solution passing into the neutralizer. As hereinafter described sodium hydroxide solution, as recovered by the process, is introduced into the line 46 through a line 54 to make up with sodium hydroxide from the tank 42 the 8% sodium hydroxide solution which flows into the neutralizer. In view of the fact that the sodium hydroxide being recycled in the process may vary in strength, it is necessary to maintain a hydrometer control with electric relay 56 for control valve 52 in order to maintain a substantially 8% sodium hydroxide solution.

As hereinafter described the 8% strength sodium hydroxide solution is very important in order that the sodium tetrahydronaphthalene peroxide formed in the neutralizer, may be precipitated as a granular material which may be readily filtered and easily washed.

The precipitated sodium tetrahydronaphthalene peroxide, together with the reaction products, is forced through a line 58 by pump 60 into a filter press 62. The filtrate which is composed of sodium hydroxide solution, tetrahydronaphthalene, a small amount of tetralol and tetralone, together with tetrahydronaphthalene peroxide dissolved in the tetrahydronaphthalene, is passed through a line 64 to be treated as hereinafter described.

After the filtrate is removed, the precipitate is washed by means of toluol which is held in a tank 66. The toluol is taken from the tank 66 through a line 68 by means of a pump 70 to the filter press. The toluol washings from the filter press pass through a line 72 into a kettle 74 of a fractionating still 76. The distilled toluol passes overhead through a condenser 78 and then flows back to the tank 66. In place of toluol other aromatic hydrocarbon solvents such as benzene and xylene, and also ether, may be used for washing the sodium tetrahydronaphthalene peroxide. Impurities including tetrahydronaphthalene are withdrawn from the still pot through a line 79 and this tetrahydronaphthalene is then returned to the line 12 through a line 80 (Figure 1). Some of the toluol will be lost in the washing operation and make-up toluene may be added to the tank 66 through a line 82.

The precipitated sodium tetrahydronaphthalene peroxide dissolved in water is passed from the filter press 62 through a line 84 to a neutralizer 86. The sodium tetrahydronaphthalene peroxide is maintained in the filter press 62 and neutralizer 86 at a temperature of 8° to 10° C. to prevent the tetrahydronaphthalene peroxide from being broken up into tetralone and tetralol. To assist in maintaining this temperature a brine jacket 88 surrounds the neutralizer 86 and a stirrer actively agitates the sodium tetrahydronaphthalene product to bring it to a uniform temperature. The neutralization of the sodium tetrahydronaphthalene peroxide is carried out by means of sulphuric acid which is taken from a tank 90 and pumped through a line 92 into the neutralizer. The sulphuric acid reacts with the sodium tetrahydronaphthalene peroxide to form sodium sulphate and set free tetrahydronaphthalene peroxide. The tetrahydronaphthalene peroxide is passed through a line 94 to a filter press 96 where it is filtered and washed with water. The water is taken from a tank 98 and pumped through a line 100 to the filter press. The sodium sulphate exhausts from the filter press through lines 102 and the washed tetrahydronaphthalene peroxide in solid form is removed from the filter and transferred to a drier 106 as indicated by a line 104.

The tetrahydronaphthalene peroxide is preferably dried in a vacuum. To accomplish this the wet tetrahydronaphthalene peroxide is introduced into the drier 106 which is heated by hot water to a temperature below 50° C. and when sufficiently dry is conducted through a line 108 to a closed container 110. A vacuum pump 112 is connected through a condenser 114 to the vacuum drier.

The filtrate removed from the filter press 62 is treated in a reactor 116 (Figure 1a) which is connected with the line 64. The reactor 116 is provided with a heating jacket 118 by which the temperature of the mixture of tetrahydronaphthalene, tetrahydronaphthalene peroxide, tetralol and tetralone are heated to a temperature of 80 to 90° C. To make this heating effective a stirrer 120 is operated to provide a uniform temperature throughout. In the heating, the tetrahydronaphthalene peroxide is changed to a mixture of approximately 49% alpha-tetralol and 51% alpha-tetralone. To assist in recovering all of the tetrahydronaphthalene dissolved in the caustic soda solution, additional caustic soda is taken from a tank 122 and pumped through a line 124 to increase the strength of the caustic in the reactor 116. The caustic solution having the tetralone and tetralol therein is passed from the reactor 116 through a line 126 into a settling chamber 128. The caustic soda solution settles to the bottom of the chamber 128 and may be withdrawn through a line 130 to be discarded or preferably the caustic soda solution is sent through a line 132 back to the line 54 (Figure 1) to be used in the neutralizer 36 as hereinbefore referred to.

The supernatant solution in the settling chamber 128 is withdrawn through a line 134 and pumped into a receiver 136. This solution is composed of tetrahydronaphthalene, alpha-tetralone and alpha-tetralol. The solution passes from the tank 136 through a line 138 into the mid-portion of a fractionating still 140. The still pot is heated by coil 142 to drive overhead tetrahydronaphthalene which passes through condensers 144 into a receiver 146. The still 140 is preferably maintained under a vacuum by means of a vacuum pump 148 which is connected with the receiver 140. By maintaining the temperature below 150° C. the alpha-tetralol is not decomposed. The tetrahydronaphthalene may be withdrawn from the receiver by means of a pump 150 and passed through a line 152 back to the line 80 (Figure 1) to be again oxidized in the oxidizer 14.

The bottoms product of the still 140 is composed of tetrahydronaphthalene, alpha - tetralone, alpha-tetralol and some neutralized products. This mixture is pumped from the still by means of pump 152 through a line 154 into a receiver 156. From the receiver the solution passes through a line 158 into a still 160. The impure tetralol and tetralone mixture is distilled in the still 160 under a vacuum of approximately 50 mm. of mercury which is maintained by means of a vacuum pump 162 connected with the upper portion of a receiving tank 164. The purified mixture of alpha-tetralol and alpha-tetralone are conveyed through a line 166 to a storage tank 168. The bottoms composed principally of impurities are pumped from the still 160 through a line 170 into a storage tank 172.

In Table I is shown the distribution of tetrahydronaphthalene peroxide in the sodium hydroxide or water layer and in the hydrocarbon or tetrahydronaphthalene layer when using different strengths of sodium hydroxide. The oxidation was carried out at a temperature of 80° C. and the oxidation continued until approximately 24% of the tetrahydronaphthalene peroxide is formed from the tetrahydronaphthalene. With the 2% caustic it is very difficult to separate the tetrahydronaphthalene peroxide from the reaction products, in fact a good separation of tetrahydronaphthalene peroxide from the reaction products cannot be obtained with a caustic soda solution less than 6%. In treatment with 8% caustic 84% of the peroxide originally present in the oxidized tetrahydronaphthalene is extracted from the tetrahydronaphthalene and 16% remains in solution in the tetrahydronaphthalene. The peroxide remaining in the tetrahydronaphthalene together with the sodium tetrahydronaphthalene peroxide present in the aqueous caustic solution after filtration is recovered as explained above as a mixture of approximately equal parts of alpha-tetralol and alpha-tetralone.

TABLE I

Extraction of tetrahydronaphthalene peroxide from tetrahydronaphthalene with aqueous alkaline solutions Concentration of tetrahydronaphthalene peroxide in tetrahydronaphthalene = 24%.]

| Concentration of Alkali in Aqueous Solution | Temperature, Degrees C. | Peroxide Content of Hydrocarbon and Aqueous Layers after Extraction | |
|---|---|---|---|
| | | Water Layer | Hydrocarbon Layer |
| | | Per Cent | Per Cent |
| 2% NaOH | 10 | 5.4 | 19.1 |
| 4% NaOH | 10 | 9.9 | 14.9 |
| 6% NaOH | 10 | 14.0 | 9.6 |
| 8% NaOH | 10 | 16.0 | 4.9 |

The peroxide content values shown in Table I were obtained by treating a definite volume of tetrahydronaphthalene peroxide with an equal volume of each of the various strengths of sodium hydroxide. The concentrations of tetrahydronaphthalene peroxide are expressed in grams of tetrahydronaphthalene peroxide per 100 ml. of solution. With reference to the extractions of tetrahydronaphthalene peroxide with 6% and 8% NaOH the measurements of tetrahydronaphthalene peroxide concentration in the aqueous caustic layer were made before crystallization began. The 6% and 8% caustic solutions are supersaturated solutions of the peroxide and upon standing crystals of sodium tetrahydronaphthalene peroxide will separate from the solutions.

In Table II is shown the solubility of tetrahydronaphthalene peroxide in sodium hydroxide solution. It may be stated that no crystals of sodium tetrahydronaphthalene peroxide are formed when neutralizing the oxidized products with a 4% caustic soda solution.

From the tables it will be seen also that the amount of tetrahydronaphthalene peroxide which remains in tetrahydronaphthalene decreases as the concentration of the caustic soda increases. On the other hand, the amount of tetrahydronaphthalene peroxide which is removed by the caustic soda solution increases as the concentration of the caustic soda increases. It has been found, however, that 8% concentration is quite critical in giving an effective recovery of the tetrahydronaphthalene peroxide and maintaining the tetrahydronaphthalene peroxide in a suitable crystalline form by which it may be readily filtered.

TABLE II

Solubility of tetrahydronaphthalene peroxide in sodium hydroxide solutions

| Concentration of NaOH | Temperature, Degrees C. | Concentration of Tetrahydronaphthalene Peroxide in Caustic Solution |
|---|---|---|
| Per Cent | | Per Cent |
| 4 | 10 | 9.6 |
| 6 | 10 | 7.6 |
| 8 | 10 | 6.8 |
| 8 | 20 | 8.9 |

The concentrations of tetrahydronaphthalene peroxide as shown in Table II are expressed in grams of tetrahydronaphthalene peroxide per 100 ml. of solution.

As an example of the present invention 25,750 lbs. of tetrahydronaphthalene per day was oxidized in the presence of 25.8 lbs. of cupric carbonate catalyst at 90° C. and 65 lbs. p. s. i. For the oxidation 221,800 cubic feet of air measured at 60° F. and atmospheric pressure were passed through the tetrahydronaphthalene. The reaction product was cooled to 10° C. and neutralized with 28,900 lbs. of 8% sodium hydroxide solution. The solution was then filtered to separate a sodium salt of tetrahydronaphthalene peroxide which was washed with 898 gallons of toluene and neutralized with 9,866 lbs. of 10% sulphuric acid solution. The neutralized precipitate was again filtered at 10° C. and washed with 6,186 lbs. of water and then dried in a vacuum at 30° to 40° C. to recover approximately 3,000 lbs. of tetrahydronaphthalene peroxide. The filtrate from the first filtration of the tetrahydronaphthalene peroxide was composed of 18,415 lbs. of tetrahydronaphthalene, 1026 lbs. of alpha-tetralol and alpha-tetralone mixture with 1014 lbs. of tetrahydronaphthalene peroxide in an organic layer and 2163 lbs. of tetrahydronaphthalene peroxide in a water layer. This filtrate was treated with 5025 lbs. of 70% solution of sodium hydroxide and heated at a temperature of 60° to 80° C. with active stirring. This heating reaction converts the sodium salt of tetrahydonaphthalene peroxide to a mixture, of substantially equal parts of alpha-tetralol and alpha-tetralone, and sodium hydroxide. The heated mixture is then decanted to separate an aqueous layer and an organic layer.

The organic layer was then distilled under vacuum to take overhead 17,500 lbs. of tetrahydronaphthalene and a base cut containing 4140 lbs. of a mixture of alpha-tetralol and alpha-tetralone which are present in about equal proportions.

The preferred form of the invention having been thus described, what is claimed as new is:

I claim:

1. In the production of tetrahydronaphthalene peroxide wherein tetrahydronaphthalene is oxidized by oxygen-containing gas to form a reaction mixture containing a substantial amount of tetrahydronaphthalene peroxide, the method of obtaining a high yield of tetrahydronaphthalene peroxide from said reaction mixture which comprises forming a granular precipitate of the sodium compound of tetrahydronaphthalene peroxide by neutralizing said reaction mixture with a dilute solution of caustic soda containing about 8 to 10 percent of sodium hydroxide while cooling said reaction mixture and caustic solution to a temperature below 15° C. to remove the heat of neutralization, filtering out said granular precipitate from supernatant liquid, recovering free tetrahydronaphthalene peroxide from said precipitate by acidification, and drying the free tetrahydronaphthalene peroxide in a vacuum at a temperature below 50° C.

2. In the production of tetrahydronaphthalene peroxide wherein tetrahydronaphthalene is oxidized by oxygen-containing gas to form a reaction mixture containing a substantial amount of tetrahydronaphthalene peroxide, the method of obtaining a high yield of tetrahydronaphthalene peroxide from said reaction mixture which comprises forming a granular precipitate of the sodium compound of tetrahydronaphthalene peroxide by neutralizing said reaction mixture with a dilute solution of caustic solution containing substantially 8 percent of sodium hydroxide while maintaining said reaction mixture at a temperature of about 10° C., filtering out said granular precipitate from supernatant liquid, recovering free tetrahydronaphthalene peroxide from said precipitate by acidification at a temperature of about 10° C., and drying the free tetrahydronaphthalene peroxide in a vacuum at a temperature below 50° C.

3. In a process for the production of tetrahydronaphthalene peroxide wherein tetrahydronaphthalene is oxidized by oxygen-containing gas in an oxidation zone to form a reaction mixture containing a substantial amount of tetrahydronaphthalene peroxide, the method of obtaining a high recycle yield of tetrahydronaphthalene peroxide in said process which comprises forming a granular precipitate of the sodium compound of tetrahydronaphthalene peroxide by neutralizing said reaction mixture with a dilute solution of caustic solution containing about 8 to 10 percent of sodium hydroxide while maintaining said reaction mixture at a temperature of about 10° C., filtering out said granular precipitate from supernatant liquid, recovering free tetrahydronaphthalene peroxide from said precipitate by acidification at a temperature of about 10° C., drying the free tetrahydronaphthalene peroxide in a vacuum at a temperature below 50° C., recovering unreacted tetrahydronaphthalene from the filtrate from the separation of the sodium compound of tetrahydronaphthalene peroxide and recycling the tetrahydronaphthalene so recovered to the oxidation zone.

ROBERT JOHNSON.

REFERENCES CITED

The following references are of record in the file of this patent:

UNITED STATES PATENTS

| Number | Name | Date |
| --- | --- | --- |
| 1,924,786 | Hartmann | Aug. 29, 1933 |
| 2,436,864 | Johnson | Mar. 2, 1948 |
| 2,454,804 | Johnson | Nov. 30, 1948 |

Certificate of Correction

Patent No. 2,568,639　　　　　　　　　　　　　　　　　　　September 18, 1951

ROBERT JOHNSON

It is hereby certified that error appears in the printed specification of the above numbered patent requiring correction as follows:

Column 1, line 23, for "coverting" read *converting*; column 3, line 27, for "8°" read *8%*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*